July 27, 1948.  A. SIMMON ET AL  2,446,111
DEVICE FOR MAKING TEST PRINTS
ON COLOR PRINT MATERIAL
Filed Aug. 15, 1946  6 Sheets-Sheet 1
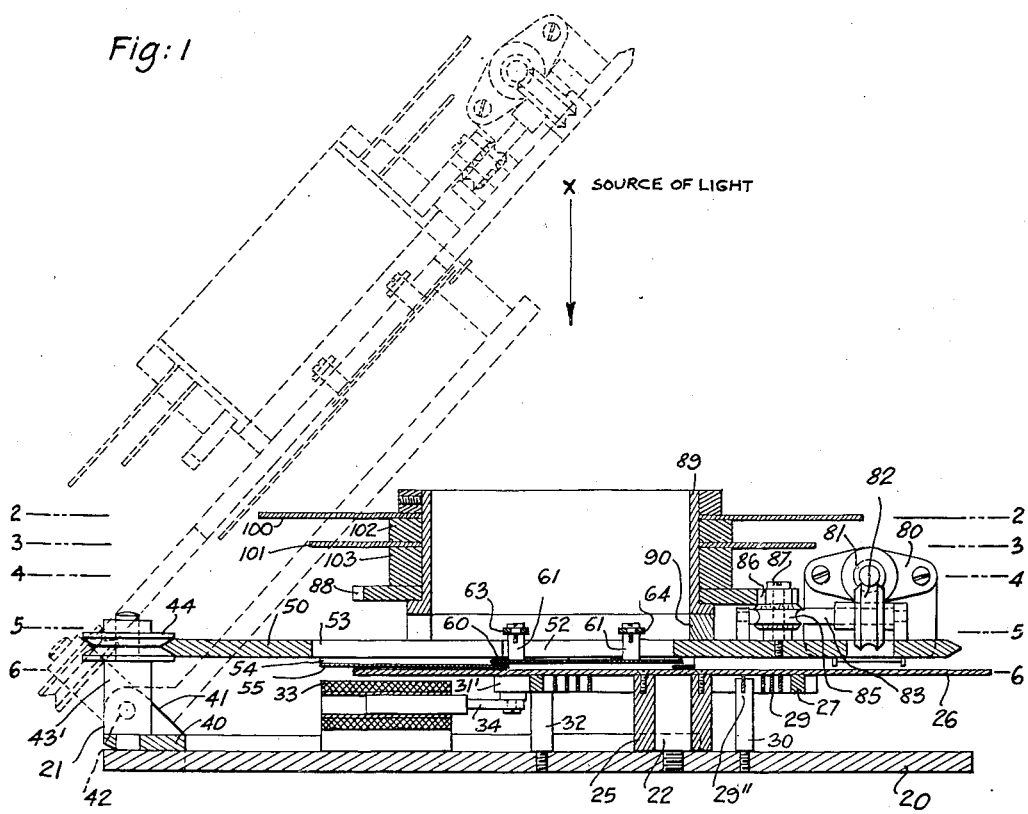
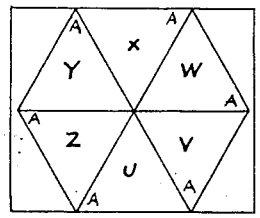
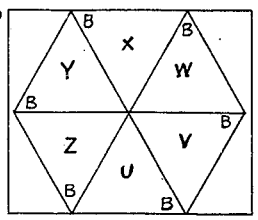
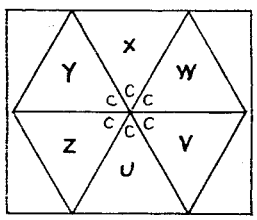
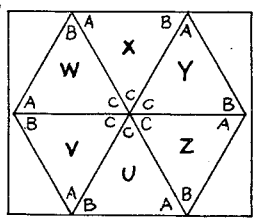
Alfred Simmon
Louis L. Weisglass
INVENTORS
BY Walter S. Wollheim
ATTORNEY.

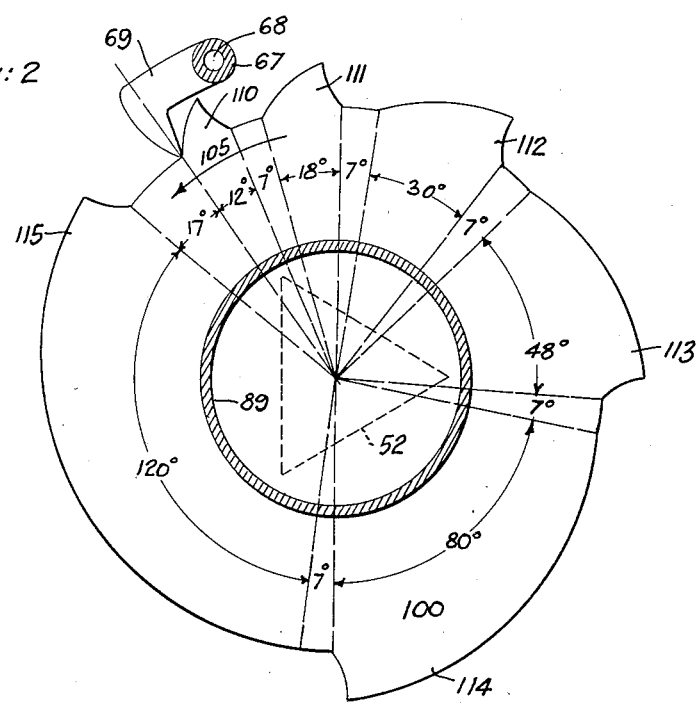

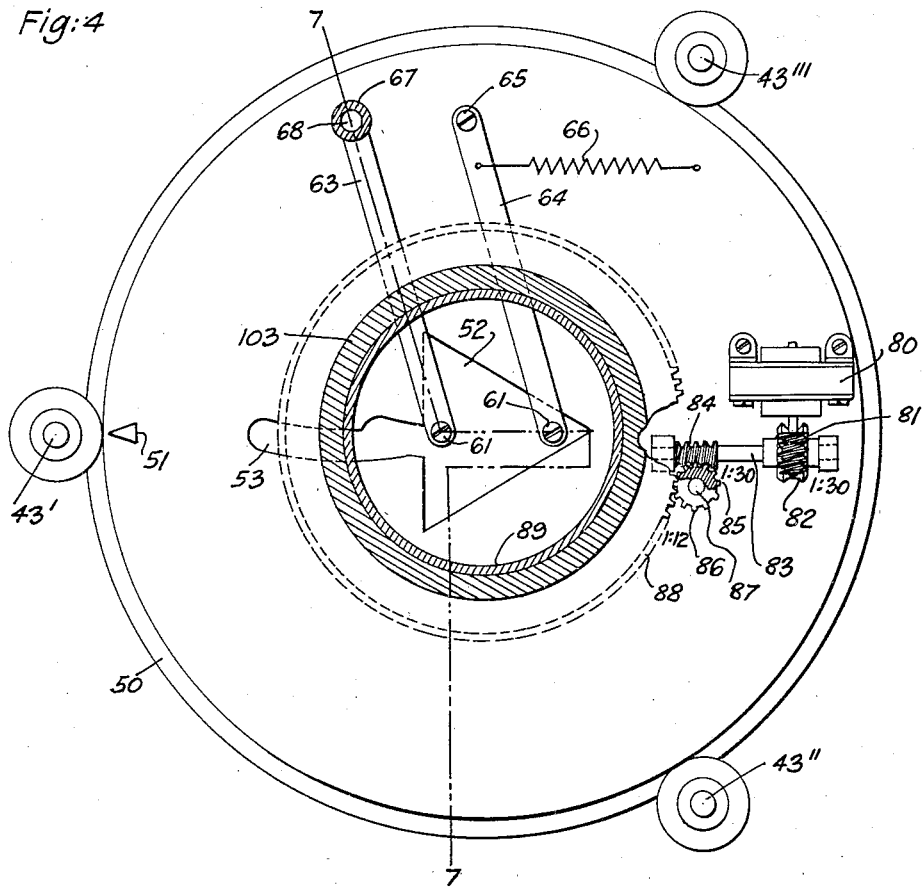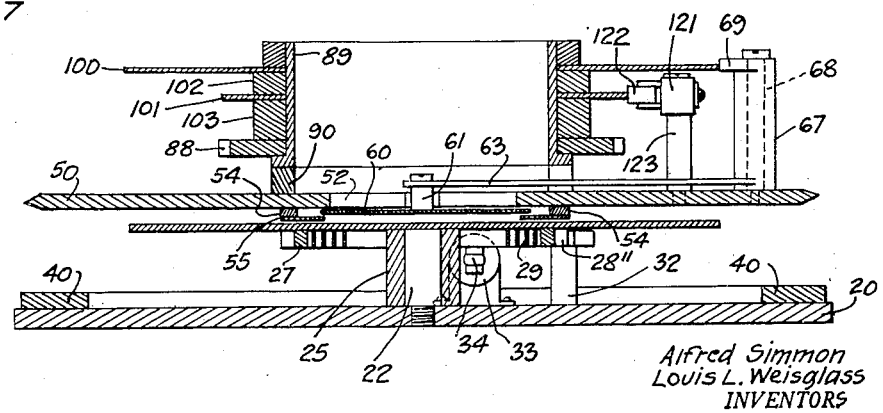

July 27, 1948.   A. SIMMON ET AL   2,446,111
DEVICE FOR MAKING TEST PRINTS
ON COLOR PRINT MATERIAL
Filed Aug. 15, 1946   6 Sheets-Sheet 4
Fig: 5a
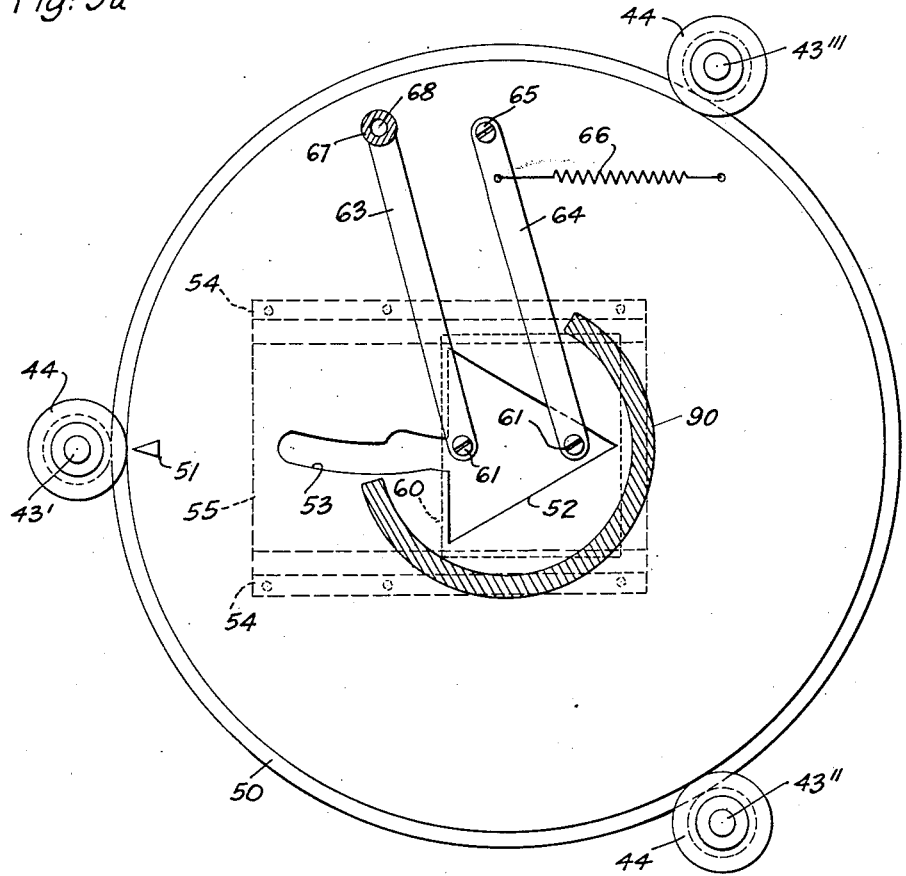
Alfred Simmon
Louis L. Weisglass
INVENTORS
BY Walter S. Wollheim
ATTORNEY.

July 27, 1948.　　A. SIMMON ET AL　　2,446,111
DEVICE FOR MAKING TEST PRINTS
ON COLOR PRINT MATERIAL
Filed Aug. 15, 1946　　　　　　　　　　　6 Sheets-Sheet 5
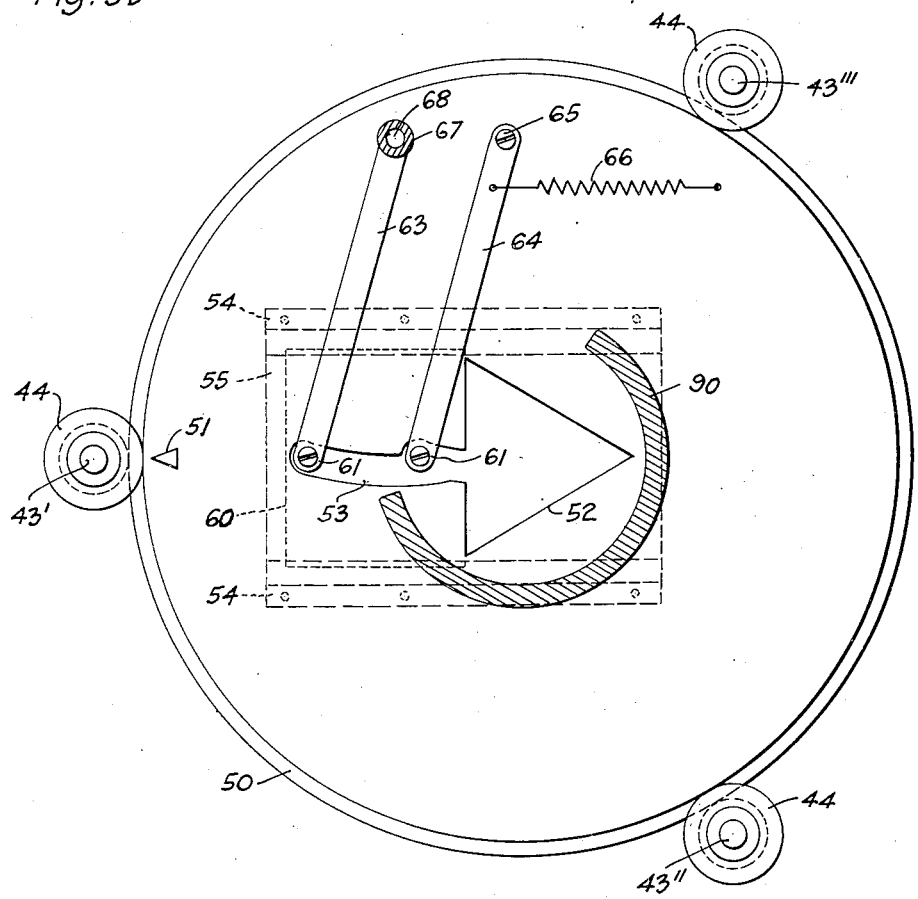
Fig: 5b
Alfred Simmon
Louis L. Weisglass
INVENTORS
BY Walter S. Wollheim
ATTORNEY.

July 27, 1948.    A. SIMMON ET AL    2,446,111
DEVICE FOR MAKING TEST PRINTS
ON COLOR PRINT MATERIAL
Filed Aug. 15, 1946    6 Sheets-Sheet 6
Fig:6
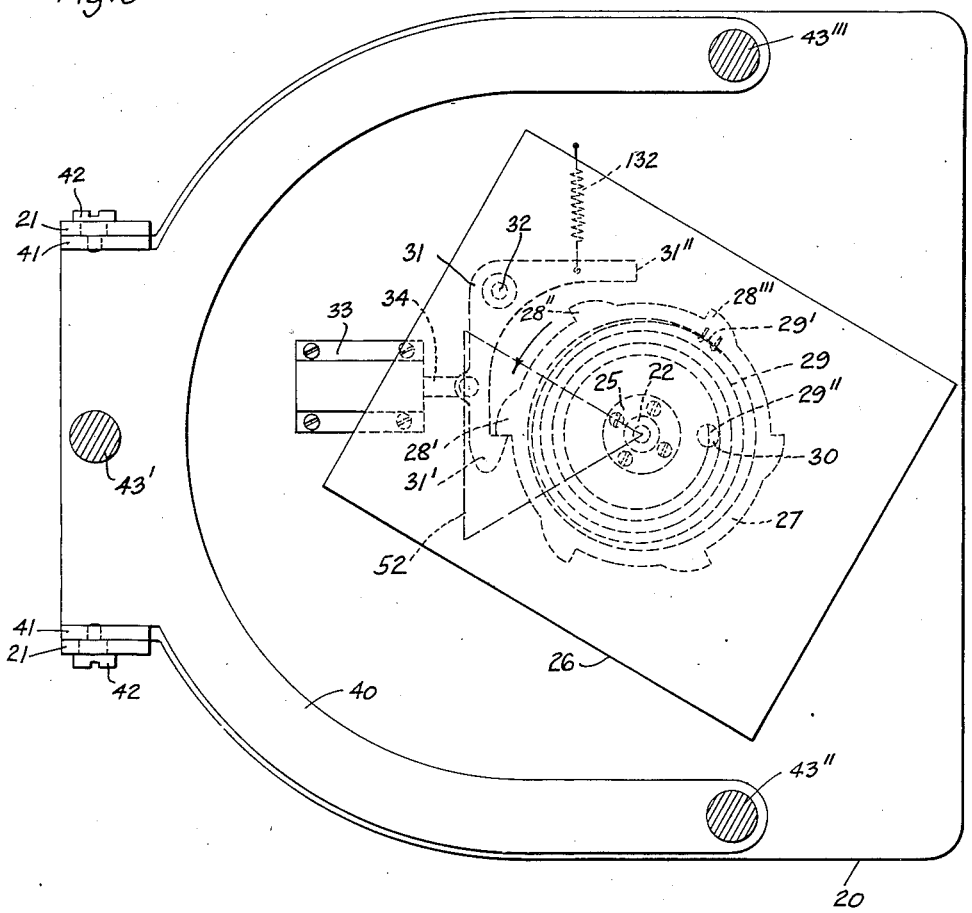
Fig:8
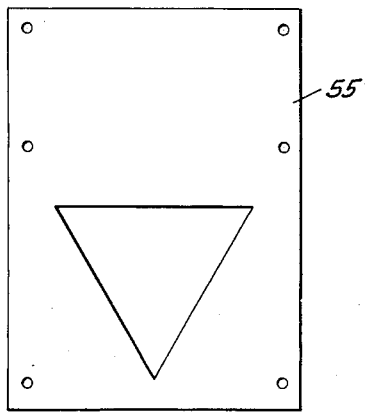
Alfred Simmon
Louis L. Weisglass
INVENTORS
BY Walter E. Wollheim
ATTORNEY.

Patented July 27, 1948

2,446,111

UNITED STATES PATENT OFFICE 2,446,111

DEVICE FOR MAKING TEST PRINTS ON COLOR PRINT MATERIAL

Alfred Simmon, Jackson Heights, and Louis L. Weisglass, New York, N. Y., assignors to Simmon Brothers, Inc., Long Island City, N. Y., a corporation of New York Application August 15, 1946, Serial No. 690,688

10 Claims. (Cl. 95—10)

Photographic color print material is, at the present time, made of two principal types which may be called the monopack and the separation-transfer type, respectively. In the monopack, a plurality of sensitized emulsions, usually three, are coated on a common base. Each of these emulsions is sensitized to one primary color only and is adapted later, during the processing of the monopack, to be dyed with an appropriate color. Distinguished herefrom, the separation-transfer process necessitates the making of three separate prints, usually from three separation negatives in the three primary colors, on three separate sheets. During the processing these sheets are developed, dyed in appropriate colors, and eventually all three images are transferred to a common base. It is the purpose of this invention to provide a mechanical device for the testing of color print material of the separation-transfer type. A method of making test prints on color print material is claimed in divisional application #743,948 filed April 25, 1947.

Sensitized material for ordinary black and white photography is usually tested by making a so-called stepwedge print. By a stepwedge print we generally understand an elongated strip of such material divided into a fairly large number of small rectangular areas which are subjected in some manner to a steadily increasing or decreasing exposure to white light. The relative densities obtained by this method enables one to judge the properties of this material.

The application of this principle to color print material is not quite simple since it is not sufficient to make, for example, three stepwedge prints with the three primary colors, respectively, because for really complete information it is necessary to provide some means by which one can obtain areas which are exposed to any conceivable combination of three respective exposure times for the three primary colors. In order to do this, we replace according to this invention each rectangular area of a stepwedge print by a triangle which is being exposed non-uniformly to three part exposures with the three primary colors, respectively. Each corner of the triangle receives full exposure of one color, the side of the triangle opposite this corner receives no exposure of this particular color, and intermediate points receive intermediate exposures which are timed in proportion to the distance of each point from said side of the triangle. A triangle exposed in this manner will show the three corners in more or less bright colors, usually red, blue and green. The luminosity of these colors diminishes gradually as the center is approached, and the center should show, with a well balanced material, a neutral gray. If the exposure times to which each point of the triangle has been exposed for each color increases in linear proportion from each side of the triangle to its opposite corner, the sum of the three exposure times will be constant over the entire area of the triangle. An infinite number of such triangles is conceivable, depending upon the magnitude of said sum. In reality, of course, we have to compromise and be satisfied with a relatively small number of triangles, but even a small number will give adequate information about the behavior of the color print material if the sum of the three exposure times for each triangle follows a suitable, usually geometric, progression, and if thereby a sufficient range of exposure times is being covered.

According to this invention, we subject consecutively on three separate sheets of color print material to be tested, a plurality of triangular areas on each sheet to non-uniform exposures of varying lengths. For purposes of ready identification, each triangle is supposed to have an "A," "B" and "C" corner. The triangles occupy identical positions on the three sheets and the "A," "B" and "C" corners of corresponding triangles occupy identical positions. All triangles on the first sheet are so exposed that the "A" corner receives full exposure and the side opposite the "A" corner receives no exposure, intermediate points receiving intermediate exposure values in dependence upon their distance from said side. While thus all "A" corners receive full exposure, the length of this exposure varies from triangle to triangle. On the second sheet all "B" corners receive full exposure, the sides opposite the "B" corners receive no exposure and intermediate points receive intermediate exposures. The value of the full exposures again changes from triangle to triangle. The third sheet is then subjected to the same treatment with respect to the "C" corners. Exposure values are assigned to various triangles on all three sheets in such a manner that the "A" corners of each triangle on the first sheet receive the same exposure time as the "B" corners of the corresponding triangles on the second sheet and the "C" corners of the corresponding triangles on the third sheet.

The three sheets, after being exposed in the manner described are then subjected to the customary chemical treatment, usually including development and possibly fixing. The image which is usually, but not necessarily, composed of precipitated silver is then, by one of the several processes well known in the art, replaced by a pure dye image, the three sheets, of course, receiving dyes of three different colors; generally three primary colors, i. e., red, blue and green are used, or the corresponding complimentary colors, minus red, minus blue and minus green, depending upon the nature of the process. These dye images are then transferred to a common paper base and superimposed in such a manner that corresponding triangles are in register with each other.

The result is a test sheet with a number of triangular exposures. The "A" corner of each triangle appears, for example, red, the "B" corner blue, and the "C" corner green, and in a well balanced color material the center of the triangle will be a neutral gray. The exposure times for the three corners are equal to each other, but vary from triangle to triangle and, therefore, while all "A" corners appear red, all "B" corners blue, and all "C" corners green, these colors will be lighter or darker from triangle to triangle, depending upon the predetermined variation of exposure times. For example, the first triangle may be almost entirely black, showing merely some very dark traces of red, blue and green, respectively, in the corners. The next triangle will be somewhat less dark, and the corners will be more vividly colored, and one of the subsequent triangles may show really luminous colors. From then on, on subsequent triangles, the colors will begin to fade until the last triangle is almost completely white, with perhaps a slight color tinge in the corners.

A preferred embodiment of this invention is illustrated in the accompanying drawings, in which Fig. 1 is a cross-sectional view through the device, the working position shown in solid lines and the position in which a new sheet of material can be inserted shown in dotted lines;

Figs. 2 and 3 are views in the planes of lines 2—2 and 3—3, respectively, of Fig. 1 showing essentially the configurations of two cams;

Fig. 4 is a view in the plane of line 4—4 in Fig. 1, showing the motor drive for said cams as well as a rotating and indexing round platform on which these parts are mounted;

Figs. 5a and 5b show this rotating and indexing platform with a masking slide at the beginning and at the end of an exposure, respectively;

Fig. 6 is a view in the plane of line 6—6 of Fig. 1 showing essentially the rotating and indexing support for the color print material;

Fig. 7 is a cross-sectional view along the plane of line 7—7 as shown in Fig. 4;

Fig. 8 is an aperture plate, the purpose of which will be explained later; and

Figs. 9a, 9b, 9c and 9d are schematic diagrams of the test print obtainable with a device constructed according to this invention.

Like characters denote similar parts throughout the several views and the following specification.

General design

The preferred embodiment of the device comprises a supporting structure made of two principal parts, the base and the hinged top. The base carries a support for the color print material including means to rotate and index this support between exposures. The hinged top carries an indexing and rotatable table on which are mounted a motor drive with a train of gears, a cam assembly actuated by said motor drive, and a masking slide with a supporting lever assembly. One of the cams actuates through that lever assembly said masking slide, and the second of said cams actuates said aforementioned rotating and indexing means for the support for the color print material.

Base

The base is shown in cross-sectional view in Figs. 1 and 7 and its outline can be seen in Fig. 6. It comprises a flat plate 20, preferably made from aluminum or the like, to which certain other elements are attached. These other elements are lugs 21 which support the hinged top to be described in one of the following paragraphs and a shaft 22 which serves as a pivot for the rotating and indexing support of the color print material.

Support for color print material

This unit is shown cross-sectionally in Figs. 1 and 7 and a plan view is seen in Fig. 6. It is supported by the aforementioned pivot 22 which is surrounded by a hub 25 carrying a rectangular plate 26, preferably made from sheet aluminum. The size of this part should preferably correspond to the most readily available size of color print material, and for that reason the dimensions 8" x 10" are usually chosen. Means must be provided to attach a sheet of color print material to the upper surface of plate 26. Since spring clips or the like are well known in the art, these means have, in the interest of clarity, not been shown in detail in the drawings.

Fastened to the upper surface of plate 26 is a ratchet gear 27 which carries a plurality of ratchet teeth 28', 28" and so forth.

Means are provided to urge plate 26 and ratchet gear 27 to rotate. These means may be of any desired description and, for example, a small electrical torque motor may be used. Merely as an example, we are showing a torsion spring 29 of the kind used in large clockworks. One end of this spring 29' is attached to the ratchet gear 27, whereas the other end 29" is attached to a stud 30 which is, in turn, fastened to the base plate 20. This spring urges plate 26 to rotate in a counter-clockwise direction. It is, of course, necessary that the operator turns plate 26 at least once in a clockwise direction before starting the exposure, thereby tensioning the spring.

The rotatable assembly comprising parts 26 and 27 is restrained by ratchet 31 pivoted on a shaft 32 which is, in turn, supported by base plate 20. This ratchet 31 has two ends, one with a hook like shape 31' and another one 31". It is biased by a small spring 132.

A solenoid 33, comprising in the usual manner a coil and a movable armature, is attached to base plate 20 and connected by means of link 34 to the ratchet 31. By viewing Fig. 6, it will be clear that as soon as solenoid 33 is energized, one arm 31' of the ratchet 31 is retracted, permitting tooth 28' of the ratchet gear to pass. At the same time, however, the other arm 31" of the ratchet is moved downwardly in the path of ratchet tooth 28''' stopping its movement after a travel of 30°. Upon release of the solenoid, ratchet 31 assumes again its original position as shown in Fig. 6, i. e., arm 31" of the ratchet permits now tooth 28''' of the ratchet gear to pass, but at the same time, arm 31' moves in the patch of tooth 28", thereby stopping the rotation of the ratchet gear 27 after another 30°. In other words, every time solenoid 33 receives a current impulse, ratchet gear 27 and therewith plate 26 perform a rotation of 60°. The rotation of 60° is, of course, merely by way of example and any other angle may be chosen if so desired.

As can be seen in Fig. 6, the axis of rotation of support 26 coincides at least substantially with one of the corners of a triangular exposure area 52.

Hinged top

Referring to Figs. 1 and 6, the hinged top comprises a horseshoe shaped part 40, the outline of which can be seen in Fig. 6 and which is, preferably, fabricated from an aluminum plate. On one side two lugs 41 are attached which cooperate with the aforementioned lugs 21 attached to the base to form a hinge. Shoulder screws 42 are fastened to lugs 41 and permit, in the manner visible in Figs. 1 and 6, the rotation of the hinged top.

Fastened to the hinged top are three studs 43', 43" and 43''', each of which carries a grooved roller 44. The studs 43 and the rollers 44 are also visible in Figs. 4 and 5. It is the purpose of these rollers to support the rotatable table to be described in the next paragraph.

Rotatable table

The cross-sectional view of this table is seen in Figs. 1 and 7. It comprises a round plate 50, the circumference of which is machined so as to fit into the groove of rollers 44 as can be observed at the left side of Fig. 1. Referring to Figs. 4 and 5, this table is equipped with a mark 51 by means of which its position can be readily identified. As shown in these figures, the mark points at the center of the left roller supporting stud 43'. Since the table can be freely rotated, it can be readily positioned in such a manner that this mark will point to the center of either of the two other roller supporting studs 43" or 43'''.

As can be seen in Figs. 4 and 5, the axis of rotation of the rotatable table 50 coincides with the center of the triangular exposure area 52. This center is the point of intersection of lines connecting corners of the triangle with the center points of the respective opposite sides.

In the center of the rotatable table 50, we have a triangular aperture 52 as well as an elongated slot of peculiar shape 53. It is the purpose of the triangular aperture 52 to admit light to the exposure area, and the elongated slot 53 is provided for the purpose of permitting a mechanical connection between the masking slide and its supporting lever system to be described later.

Mounted below table 50 and separated therefrom by relatively thin spacers 54, see Fig. 7, is an aperture plate 55, which again is shown separately in Fig. 8. This aperture plate has a triangular aperture 56 which has the same dimensions as the corresponding triangular aperture within table 50. The aperture plate is mounted so that the two triangular apertures are in the same position. As can be seen in Fig. 7, the table 50, the spacers 54, and the aperture plate 55 form a channel in which the mask 60 can slide.

Mounted on the rotatable table 50 are the masking slide and its lever assembly and the rotating cam assembly comprising two cams and a motor drive including a train of gears.

Masking slide and lever assembly

The masking slide and the lever assembly can most readily be seen in Figs. 5a and 5b. Certain features, such as the hubs of certain levers, are shown in Fig. 7.

The masking slide 60 itself is shown in dotted lines in Figs. 5a and 5b, one of these figures representing the position of the slide at the beginning and the other the position of the slide at the end of the exposure.

This slide is positioned underneath the rotatable table 50 and is supported by two studs 61. These studs are somewhat longer than the thickness of table 50, and protrude through the aforementioned slot 53. Fastened to stud 62 are two levers 63 and 64 which form a parallelogram movement whereby the masking slide 60 can be moved parallel to itself in a flat arc closely approximating a straight line. Lever 64 is pivotally supported at its other end by a pivot 65 which is stationarily fastened to the rotatable table 50. This lever is biased by a spring 66. The other lever 63 is fastened to a relatively long hub 67 which rotates on a stationary shaft 68 which is again fastened to the table 50. The upper end of hub 67 carries a relatively short lever 69 which can be seen in Fig. 2 and which constitutes the cam following element in operative engagement with the cam shown in Fig. 2 and to be described in one of the following paragraphs. The assembly of lever 63, hub 67 and lever 69 can be seen in Fig. 7.

The exposure of the triangular area can be achieved in two different ways. We can start with a triangle fully exposed and cover or mask its area gradually during the exposure time, covering one of the sides of the triangle first and the corner opposite said side last, or we could reverse the procedure and start with the triangle completely covered and expose the corner first, adjacent areas thereafter, and the side opposite said corner last. The two methods are perfectly equivalent and merely as a matter of example, we have chosen in our embodiment of this invention the latter method. After the triangle has been completely exposed at the end of a part exposure, the exposure must, in theory, be terminated instantaneously and, in practice at least, very fast. This can be done, for example, by switching off the lamp from which the exposing light originates, but in the interest of simplicity, we merely permit the masking slide to return quickly, and this is the reason why the lever 69 is not equipped with a cam following roller, but merely with a knife edge since, in this manner, a more rapid return is possible than with a roller.

Motor drive

The motor drive can be seen in Figs. 1 and 4. It comprises a small motor 80, preferably of the shaded coil synchronous type. These small motors usually have two poles and, therefore, have a speed of 3,600 R. P. M. The shaft of this motor carries a worm 81 which meshes with a worm gear 82 fastened to a shaft 83. The left end of this shaft carries another worm 84 which engages a second worm gear 85. The ratios of the two worm gear assemblies are 1:30 each. Fastened to worm gear 85 is a small spur gear 86. The two gears 85 and 86 rotate as a unit on a stationary pivot 87 which is fastened to table 50. The small spur gear 86 is in mesh with a large spur gear 88 which rotates on a large hollow shaft 89. This shaft is supported by a spacer 90 which, in turn, is fastened to table 50. A cross-sectional view of the spacer 90 can be seen in Fig. 5. It is of general cylindrical shape, but part of its circumference is cut away in order to permit the movement of the levers 63 and 64.

The ratio of spur gears 86 and 88 is 1:12. Together with the two worm gear assemblies which have a ratio of 1:30 each, this gives a total ratio of 1:10,800, or the two cams make, in this particular example, one revolution in three minutes.

*Cam assembly*

The cam assembly can be seen cross-sectionally in Figs. 1 and 7. The shape of the two cams is shown in Figs. 2 and 3.

The cam assembly comprises, in addition to the large spur gear 88 which was already mentioned, two cams 100 and 101 supported by spacers 102 and 103. The two cams, the spacers and the large spur gear rotate as a unit on the large hollow shaft 89.

Cam 100, shown in Fig. 2, is substantially circular in shape and carries on its circumference a number of spiral shaped abutments 110, 111, 112, 113, 114 and 115. The shape of these abutments is determined by spirals which are of the type that has a linear equation in a system of polar coordinance, i. e., the radius increases in linear proportion with the angle; these spirals are sometimes called Archimedes' spirals. The radial increment of all spirals is the same, but is distributed over different angles. For example, the shortest abutment 110 occupies an angle of 12°. The following abutment 111 has an angle of 18°, and the longest abutment 115 has an angle of 120°. The angles occupied by these spirals increase substantially in geometric progression, each angle being approximately 1.6 times as large as the angle of the preceding spiral. The spiral shaped abutments of the cam are in contact with lever 69 of the lever assembly which operates the masking slide. Due to the fact that the radius of the spirals increases in linear proportion to the angle, the masking slide is thereby propelled at a uniform rate of speed, but this rate of speed is different for each cam abutment. It is relatively large when abutment 110 is in operation and relatively slow when abutment 115 is in operation. Between subsequent cam abutments there is a gap of 7°, where the cam circumference has a constant radius. During these gaps the masking slide will be stationary, and time is thereby provided for the rotating and indexing of the support for the photographic color print material. During operation, cam 100 rotates in the direction of arrow 105.

The second cam is shown in Fig. 3. This cam is circular in shape and carries a number of small projections 120. By comparing the shape of cams 100 and 101, as shown in Figs. 2 and 3, it can be seen that the projections 120 of cam 101 are so disposed that they fall between gaps of the spiral shaped cam abutment of cam 100. It is the purpose of cam 101 to actuate the rotating and indexing support for the color print material described in one of the preceding paragraphs and shown in Fig. 6. This is not quite simple due to the fact that the supporting table 50 itself, on which the entire cam assembly with its motor drive is mounted, is adapted to assume various positions by rotation. While a purely mechanical connection is conceivable, it is apt to become somewhat complicated, and we prefer, therefore, to connect these two elements by electrical means. These means comprise a switch in operative contact with cam 101 and a solenoid 33 in operative contact with the rotating and indexing movement of the support for the color print material. The latter has already been described and can be seen in Figs. 1 and 6.

Referring again to Fig. 3, a switch 121 is shown operated by the cam abutment 120 of cam 121. This switch is shown to be of the so-called microswitch type, but it can, of course, be of any other desired design. It carries, preferably, a cam following roller 122 which is always in contact with the cam 101. The switch is supported by a stud 123, see Fig. 7, which is fastened to the rotatable table 50. This switch is connected in series with a source of electrical current and the solenoid 33, and suitable means such as flexible leads are provided for this purpose; these flexible leads have not been shown on the drawings. It will be clear that whenever cam 101, during its rotation, brings one of its abutments 120 in contact with roller 122, the switch which is normally open becomes closed for an instant and, therefore, solenoid 33 receives a current impulse. This, in the previously described manner, actuates the escapement movement which governs the rotating and indexing movement of the support for the color print material.

*Operation and method of making test prints*

The operation of the device is as follows:

Before the start of a test exposure, the hinged top is lifted, as shown in Fig. 1 in dotted lines. The rotatable platform 26 is then turned at least once by hand in a clockwise direction, whereby the spring 29 is tensioned. A sheet of the color print material to be tested is then fastened to this platform 26, and the hinged top is permitted to assume its operating position, as shown in Fig. 1 in solid lines. It is assumed that the two cams at this time have the relative positions, as shown in Figs. 2 and 3. If the cams are not in their starting position, it is merely necessary to let motor 80 run for awhile and stop it at the proper instance. The device is now ready for operation.

For the exposure a suitable source of light is placed above the center of the triangular exposure area, as indicated schematically in Fig. 1. This source of light may be of any convenient type, but it should, of course, have a color temperature identical to the one to which the color print material is subjected later during the making of actual prints. A convenient source of light for this purpose is an ordinary photographic enlarger, in which case the test device is merely placed on the easel of the enlarger. The motor is then started and the operation begins. The first abutment 110 of cam 100 actuates by means of lever 69, hub 67 and levers 63 and 64, the masking slide 60. At the beginning of the exposure this slide covers the exposure area completely, i. e., it has the position shown in Fig. 5a. During the exposure it moves from right to left, uncovering the "A" corner of the triangular exposure area first, then uncovering more and more of the triangle, and finally exposing the entire triangle. This latter position is shown in Fig. 5b. At the same time this position is reached, the extreme tip of cam abutment 110 passes the pointed tip of lever 69. The lever assembly is biased by a spring 66 and will, therefore, at this instance, snap back into its original position 5a, taking the exposure slide 60 with it. The angle covered by the cam abutment 110 is 12°, and it can easily be computed that the total exposure in our example will, therefore, equal six seconds. This means that the "A" corner of the triangle receives the full six second exposure, but due to the masking effect of the slide, the side opposite this corner will receive no exposure and intermediate points will receive intermediate exposures.

The cam 100 continues to rotate and lever 69 will rest for a short while on the circular portion of the cam between abutments 110 and 111. During this time, the masking slide will be stationary.

By comparing Figs. 2 and 3 it will be seen, however, that at this time the cam abutment 120 of cam 101 will depress the cam following roller 122 of switch 121. This switch which is normally open will, therefore, be closed for a short period of time and solenoid 33, visible in Figs. 1 and 6, will, therefore, receive a current impulse. The solenoid actuates the escapement movement consisting of pivoted lever 31 and ratchet gear 28 permitting this ratchet gear, in the manner described above, to rotate by 60° in two steps of 30° each. The rectangular platform 26 to which the color material has been fastened will perform a like rotation and will, therefore, present during the next exposure a different triangular exposure area to the source of light.

The next exposure will, in all respects, be identical with the first one except that cam abutment 111 comprises an angle of 18° instead of 12° resulting in a correspondingly longer exposure time. After cam abutment 111 has passed there is another gap of 7° provided on cam 100 during which the lever 69 and, therefore, the masking slide 60 remains stationary. During this period another projection of cam 101 will close the switch and, by means of another current impulse, energize the escapement movement of platform 26, causing it to rotate by another 60°.

This procedure will be repeated until platform 26 has performed a full revolution and until, in our example, thereby six triangular exposure areas have been exposed in the manner described.

The device is then stopped, the top is lifted, the exposed sheet removed and a fresh sheet inserted. The spring 29 urging platform 26 to rotate may, at that time, be tensioned again should this prove necessary.

At this point the entire table 50 with all the mechanism carried by it must be rotated by 120°. As shown in Figs. 4 and 5, mark 51 points at the stud 43' which supports table 50. After table 50 has been rotated 120° this mark will, of course, point to one of the other studs 43'', and it will remain in this position for the exposure of the second sheet of color print material. The exposure of the second sheet of color print material is in all respects the same as the first exposure, except that due to the 120° rotation of table 50, different corners which we may call the "B" corners of the respective triangles will be exposed.

After the second exposure cycle, the device is again stopped and the exposed sheet replaced by a fresh one. Table 50 is again rotated 120° and the third exposure cycle is performed in this position. The third exposure cycle equals the two preceding ones except that, of course, now all exposures begin at the "C" corners of the respective triangles.

The three sheets are then developed and, after development, will have an appearance which is schematically shown in Figs. 9a, 9b and 9c. In Fig. 9, all "A" corners are shown darkened. They will, in reality, be, of course, darkened in different degrees. For identification, we have called the six triangles U, V, W, X, Y and Z. If we assume that triangle U receives the shortest exposure, its "A" corner will show relatively little density. The "A" corner of the V triangle will show somewhat more density and the blackened area will extend further into the interior of the triangular area. The last triangle Z will be almost entirely black. On the second sheet we have the same appearance except that the "B" corners are at first slightly, and then more and more blackened, see Fig. 9b, and the same is shown on the third sheet, see Fig. 5, with respect to the "C" corners. It is difficult to portray the appearance of these test sheets in the drawings, but the foregoing description should explain the situation adequately.

The three sheets are then subjected to whatever treatment is necessary for the particular type of color print material selected. This includes a dye treatment with dyes of different colors for the three sheets, respectively. The three part images dyed in three different colors are then superimposed upon each other on a common base, and the temporary bases on which the exposures and the preliminary treatment took place are removed. A fairly large number of processes accomplishing this end have been developed, and it is not necessary at this point to go into details since these details do not form part of this invention. After the three colored part images have been superimposed upon each other on a common base, the test print has the appearance as schematically shown in Fig. 9d. It will be noted that here the relative positions of the "A" and "B" corners are inverted as compared to the previous figures. This is due to the transfer of the image from one base to the other. In the final print, all "A" corners, for example, may be red, all "B" corners blue and all "C" corners green. The center of the triangle should be a more or less neutral gray. Due to the varying density in the "A," "B" and "C" corners of the various triangles, respectively, the overall density and the brilliancy of the colors will vary for various triangles. This has already been explained above. The behavior of the color material on test prints of this kind permits various conclusions as to color balance and general sensitivity, and by means of these conclusions the making of correct color prints is being materially facilitated.

While we have described a preferred device for making test prints on color print material, it is obvious that many changes of operation, form, proportions and minor details of construction may be resorted to without departing from the principles or sacrificing any of the advantages of the invention, as defined in the appended claims.

What we claim as new, is:

1. A device for making test prints on photographic color print material of the separation-transfer type, comprising a structure, means to subject on said structure consecutively on three separate sheets of said material a plurality on each sheet of triangular areas to non-uniform exposures of varying lengths, said triangular areas having "A," "B" and "C" corners and occupying identical positions on said three sheets, and the respective "A," "B" and "C" corners of corresponding triangular areas occupying identical positions on each sheet, said exposing means comprising means to mask progressively parts of each triangular area during each exposure and including a movable slide, made from opaque material and having a straight edge, and means to adjust the position of said masking means relative to said exposed triangular area, whereby said straight edge may be made parallel selectively to one of the sides of said triangular area, said means comprising a rotatable table supporting said masking means including said slide, its axis of rotation substantially coinciding with the center of said triangular area, said center being defined as the point of intersection of the lines connecting the center of the sides of said triangular area to the respective opposite corners, whereby on the first sheet the "A" corners of all triangular areas receive full exposures, the sides opposite the "A" corners receive no exposures, and intermediate points receive intermediate exposures in dependence upon their distance from said side, and whereby the second and third sheets are treated in like manner with respect to the "B" and "C" corners of all triangular areas, respectively, and said masking means including speed control means, whereby the "A" corner of each triangular area on the first sheet receives the same exposure as the "B" corner of the corresponding triangular area on the second, and the "C" corner of the corresponding triangular area on the third sheet, respectively, but whereby the lengths of said exposures is rendered different for different triangular areas, the images on said three sheets adapted, after their respective exposures, to be processed, dyed in different colors and transferred, in register with, and superimposed upon each other, on a common base.

2. A device according to claim 1, said first-named means to expose a plurality of triangular areas on each sheet comprising a support in said structure for said sheet, an aperture plate with a triangular aperture immediately in front of said support, and means to move said support relative to said aperture plate between exposures.

3. A device according to claim 1, said first-named means to expose a plurality of triangular areas on each sheet comprising an aperture plate with a triangular aperture, a rotatable support in said structure for said sheet positioned immediately behind said aperture plate and its axis of rotation substantially coinciding with one of the corners of said triangular aperture, and means to rotate and index said support between exposures, whereby a plurality of triangular test exposures may be grouped symmetrically around a common center, said triangles together covering a polygonal area.

4. A device according to claim 1, including means to actuate said masking means at a uniform rate of speed, said rate of speed being identical for each of a set of corresponding triangular areas on the three sheets, but being different for different triangular areas on the same sheet.

5. A device according to claim 1, including a support in said structure for said color print material, an aperture plate with a triangular aperture, said aperture plate positioned immediately in front of said support, and said slide in close proximity to said aperture plate, means to move said slide across said triangular aperture parallel to itself in a substantially straight line, starting from one of the corners of said triangle and running substantially at right angles to said straight edge, said slide, before beginning its movement, completely covering said triangle, and exposing, during its movement, first one of the corners of said triangle, then gradually more of its area, and finally the complete triangle, and means to terminate the exposure when the straight edge of said slide reaches the side of the triangle to which it is parallel.

6. A device according to claim 1, including a support in said structure for said color print material, an aperture plate with a triangular aperture, said aperture plate positioned immediately in front of said support, and said slide in close proximity to said aperture plate, means to move said slide across said triangular aperture parallel to itself in a substantially straight line, starting from one of the corners of said triangle and running substantially at right angles to said straight edge, said slide, before beginning its movement, completely exposing said triangle, and masking, during its movement, first one of the sides of said triangle, then gradually more of its area, and finally the complete triangle, and means to terminate the exposure when the straight edge of said slide reaches the corner of the triangle opposite the side to which said edge is parallel.

7. A device for making test prints on photographic color print material of the separation-transfer type, comprising means to subject consecutively on three separate sheets a plurality of triangular areas on each sheet to non-uniform exposures of varying length, said device including a supporting structure consisting of two principal parts, the first part serving as a base and the second part hingedly attached thereto, said first principal part carrying a support for a sheet of said material, including means to rotate and index said support between exposures, its axis of rotation coinciding substantially with one of the corners of the triangular exposure area, said second principal part carrying a rotatable table including an aperture plate with a triangular aperture, its axis of rotation coinciding substantially with the center of said triangular aperture, defined as the point of intersection of the lines connecting the centers of the sides of said triangular aperture with the respective opposite corners, said table supporting a motor drive, a first cam driven thereby, a lever assembly, actuated by said first cam, and a masking slide actuated by said lever assembly and adapted to mask said triangular aperture progressively during an exposure, a second cam, also driven by said motor drive, and means in operative engagement with said second cam and controlling the rotating and indexing movement of said above-mentioned support of said color print material, said second principal part normally positioned above said first principal part in substantially parallel relationship and in close proximity thereto, whereby said triangular exposure area on said support for said color print material of the first principal part is being defined by said triangular aperture of said aperture plate of the second principal part, said second principal part adapted, by virtue of said hinged attachment, to be lifted temporarily from said first principal part, whereby said support becomes accessible for the insertion of a sheet of color print material.

8. A device according to claim 7, said first cam being of substantially circular shape carrying a plurality of spiral shaped projections, these spirals being of the type that has a linear equation in a system of polar coordinates, different spirals covering different angles on the circumference of this cam, and relatively short gaps provided between adjacent spirals, said second cam being of substantially circular shape carrying a number of relatively short projections, the angular widths and relative positions of said projections being the same as the angular widths and relative positions of the aforementioned gaps between the spiral shaped projections of said first cam.

9. A device according to claim 7, said support for a sheet of color print material with its associated rotating and indexing means comprising a turntable with a flat surface, adapted to receive said sheet, means urging said turntable to rotate, a ratchet gear with a plurality of teeth attached to said turntable, a pivoted ratchet mounted on said first principal part, and means to actuate said ratchet by the projections of said second cam, said ratchet gear and said ratchet forming an escapement mechanism adapted to rotate and index said turntable between exposures.

10. A device according to claim 7, said support for a sheet of color print material with its associated rotating and indexing means comprising a turntable with a flat surface adapted to receive said sheet, means urging said turntable to rotate, a ratchet gear with a plurality of teeth attached to said turntable, a pivoted ratchet mounted on said first principal part, and electromagnetic means mounted on said first principal part adapted to actuate said ratchet, and a switch mounted on said rotatable table carried by said second principal part, and actuated by said second cam, said switch being in series with and controlling said electromagnetic means.

ALFRED SIMMON.
LOUIS L. WEISGLASS.

REFERENCES CITED

The following references are of record in the file of this patent:

UNITED STATES PATENTS

| Number | Name | Date |
|---|---|---|
| 287,938 | Hosch | Nov. 6, 1883 |
| 884,254 | Zander | Apr. 7, 1908 |
| 2,165,167 | Hardy | July 4, 1939 |
| 2,186,138 | Henderson | Jan. 9, 1940 |
| 2,223,008 | Michaelis | Nov. 26, 1940 |
| 2,268,436 | Ash, Jr. | Dec. 30, 1941 |